UNITED STATES PATENT OFFICE.

GAIL BORDEN, OF WHITE PLAINS, AND JOHN G. BORDEN, OF SOUTH EAST, NEW YORK.

IMPROVEMENT IN PROCESSES OF PRESERVING AND CONDENSING MILK.

Specification forming part of Letters Patent No. 144,310, dated November 4, 1873; application filed October 30, 1873.

*To all whom it may concern:*

Be it known that we, GAIL BORDEN, of White Plains, in the county of Westchester, in the State of New York, and JOHN G. BORDEN, of South East, in the county of Putnam and State aforesaid, have discovered and invented a new and useful Improvement in the Process of Preserving and Condensing Milk; and we do hereby declare that the following is a full, clear, and exact description of the process and operation of the same.

Heretofore milk to be preserved and condensed has only been brought to a boiling-heat, which has been found amply sufficient to fit the fluid milk for evaporation *in vacuo;* and it has heretofore been found necessary, to preserve the milk when condensed, to combine sugar with it during the process of condensation; but for the purpose referred to in these specifications we place the milk in any suitable closed vessel, and heat the same, under a pressure, to such a degree of temperature above 212° Fahrenheit as will destroy the germs of putrescence, or any element or property in milk promoting or tending to fermentation, putrefaction, or decomposition. The milk thus treated is then let into a vacuum-pan, and condensed in the ordinary way, and then put into cans, and hermetically sealed by the usual and well-known means.

We also employ our improvement of heating the milk under pressure, as above described, and find it useful in condensing milk combined with sugar. The product which is the result of this process forms the subject of another application of the same date as this.

What we claim as our invention, and desire to secure by Letters Patent, is—

The process of preserving condensed milk, consisting in heating it above 212° Fahrenheit, so as to destroy any germs of fermentation, and then condensing it by evaporation, substantially as set forth.

GAIL BORDEN.
JOHN G. BORDEN.

Witnesses:
HAROLD A. BAGLEY,
I. HENRY KLEEIN.